United States Patent
Boury et al.

(10) Patent No.: US 9,201,801 B2
(45) Date of Patent: Dec. 1, 2015

(54) COMPUTING DEVICE WITH ASYNCHRONOUS AUXILIARY EXECUTION UNIT

(75) Inventors: Bechara F. Boury, Raleigh, NC (US); Michael Bryan Mitchell, Fuquay-Varina, NC (US); Paul Michael Steinmetz, Holly Springs, NC (US); Kenichi Tsuchiya, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 865 days.

(21) Appl. No.: 12/882,434

(22) Filed: Sep. 15, 2010

(65) Prior Publication Data

US 2012/0066483 A1    Mar. 15, 2012

(51) Int. Cl.
G06F 9/30 (2006.01)
G06F 12/08 (2006.01)
G06F 9/38 (2006.01)

(52) U.S. Cl.
CPC ........... *G06F 12/0875* (2013.01); *G06F 9/382* (2013.01); *G06F 9/3836* (2013.01); *G06F 9/3855* (2013.01); *G06F 9/3857* (2013.01); *G06F 9/3861* (2013.01); *G06F 9/3877* (2013.01); *G06F 9/3885* (2013.01); *G06F 9/3889* (2013.01)

(58) Field of Classification Search
CPC ... G06F 9/3885; G06F 9/3836; G06F 9/3877; G06F 9/382
USPC ...................................... 712/31, 34, 213, 218
See application file for complete search history.

(56) References Cited

U.S. PATENT DOCUMENTS

| | | | |
|---|---|---|---|
| 5,506,957 A | 4/1996 | Fry et al. | |
| 5,664,138 A | 9/1997 | Yoshida | |
| 5,974,534 A * | 10/1999 | Noordeen et al. | 712/215 |
| 5,974,535 A * | 10/1999 | Peng et al. | 712/215 |
| 6,014,735 A * | 1/2000 | Chennupaty et al. | 712/210 |
| 6,052,771 A * | 4/2000 | Heller et al. | 712/34 |
| 6,112,019 A * | 8/2000 | Chamdani et al. | 712/214 |
| 6,516,405 B1 * | 2/2003 | Yoaz et al. | 712/216 |
| 6,871,343 B1 * | 3/2005 | Yoshikawa | 717/161 |
| 6,928,533 B1 * | 8/2005 | Eisen et al. | 712/218 |

(Continued)

OTHER PUBLICATIONS

Oyang et al, "A Cost-Effective approach to implement a Long Instruction Word Microprocessor", Mar. 1990, ACM SIGARCH Computer Architecture News, vol. 18, Issue 1, p. 59-72.*

(Continued)

*Primary Examiner* — Andrew Caldwell
*Assistant Examiner* — Yuqing Xiao
(74) *Attorney, Agent, or Firm* — Steven L. Nichols; Van Cott, Bagley, Cornwall & McCarthy P.C.

(57) ABSTRACT

A computing device includes: an instruction cache storing primary execution unit instructions and auxiliary execution unit instructions in a sequential order; a primary execution unit configured to receive and execute the primary execution unit instructions from the instruction cache; an auxiliary execution unit configured to receive and execute only the auxiliary execution unit instructions from the instruction cache in a manner independent from and asynchronous to the primary execution unit; and completion circuitry configured to coordinate completion of the primary execution unit instructions by the primary execution unit and the auxiliary execution unit instructions according to the sequential order.

25 Claims, 8 Drawing Sheets

(56) References Cited

U.S. PATENT DOCUMENTS

| | | | |
|---|---|---|---|
| 7,162,616 | B2 | 1/2007 | Biswas et al. |
| 7,478,276 | B2 | 1/2009 | Bishop et al. |
| 7,546,441 | B1* | 6/2009 | Ansari et al. .................. 712/220 |
| 2002/0161985 | A1 | 10/2002 | Gearty et al. |
| 2008/0059771 | A1* | 3/2008 | Svendsen et al. ............. 712/218 |
| 2009/0172356 | A1* | 7/2009 | Valentine et al. ............. 712/208 |

OTHER PUBLICATIONS

Oklobdzija, in "Issues in CPU-Coprocessor Communication and Synchronization", Aug. 1988, Published by Eisevier B.V. North-Holland, Microprocessing and Microprogramming, vol. 24, Issues 1-5, pp. 695-700.*

Oklobdzija, "Architectural Study for an Integrated Fixed and Floating-point VLSI-ASIC Processor", Apr. 1988, Brussels, CompEuro '88. 'Design: Concepts, Methods and Tools', pp. 108-115.*

DeLano et al, in "A High Speed Superscalar PA-RISC Processor", Feb. 1992, Compcon Spring '92. Thirty-Seventh IEEE Computer Society International Conference, Digest of Papers, pp. 116-121.*

Darley et al., "The TMS390C602A floating-point coprocessor for Sparc systems", Jun. 1990, Micro, IEEE vol. 10 Issue 3, pp. 36-47.*

Hennessy et al., "Computer Architecture—A Quantitative Approach", 1996, Morgan kaufmann Publishers, 2nd ed., pp. 253.*

Oyang et al.; A Cost-Effective Approach to Implement a Long Instruction Word Microprocessor; Department of Computer Science and Information Engineering National Taiwan University; Taipei, Taiwan; Dec. 1989; pp. 59-72; published in newsletter ACM SIGARCH Computer Architecture News; vol. 18 Issue 1, Mar. 1990 New York, NY, USA.

Oklobdzija et al.; Architectural Study for an Integrated Fixed and Floating-Point VLSI-ASIC Processor; IBM T.J. Watson Research Center; pp. 108-115; Jul. 21, 2010 from IEEE (Institute of Electrical and Electronics Engineers); New York; New York; 1988 IEEE.

Oklobdzija, Vojin G.; Issues in CPU-Coprocessor Communication and Synchronization; North-Holland Microprocessing and Microprogramming 24 (Aug. 1988) 695-700; vol. 24, Issues 1-5; IBM T.J. Watson Research Center P.O. Box 218 Yorktown Heights, NY 10598 U.S.A.

* cited by examiner

COMPUTING DEVICE WITH ASYNCHRONOUS AUXILIARY EXECUTION UNIT

BACKGROUND

Aspects of the present specification relate to the field of data processing. More specifically, aspects of the present specification relate to the use of an auxiliary execution unit in a high frequency processor to execute a computer program.

Nearly all computer systems have a central processing unit (CPU) that includes at least one execution unit. An execution unit is a collection of hardware capable of carrying out a defined set of operations on binary operands provided by a computer program instruction. Modern computer architectures commonly utilize multiple execution units to carry out operations on different types of digital data, such as fixed-point data and floating point data. In fixed-point binary data, numbers are represented by a fixed number of significant digits with a decimal point at a fixed location. By contrast, floating point binary data uses a fixed number of significant digits with a floating decimal point and an exponential scalar.

Because the hardware required to perform a set of operations on fixed-point binary operands is not interchangeable with the hardware required to perform the same set of operations on floating point binary operands, the use of separate execution units for each type of data reduces the dependency on software to perform arithmetic functions, thereby speeding up the execution and completion of heterogeneous instructions. Additionally, in high-speed computer applications, the physical size of execution units can be a critical determinant of the efficiency of the computer applications. Thus, two smaller execution units may be desirable over a single larger execution unit.

For example, many high-frequency computer designs include a primary execution unit for carrying out operations on fixed-point binary data and an auxiliary execution unit for carrying out operations on floating point binary numbers. For a computer program that includes a mixture of both fixed-point integer instructions and floating point instructions, the computer system must coordinate operations of the primary and auxiliary execution units such that the primary execution unit provides the results to fixed-point instructions and the auxiliary execution unit provides the results for the floating point instructions of the program.

BRIEF SUMMARY

A computing device includes: an instruction cache storing primary execution unit instructions and auxiliary execution unit instructions in a sequential order; a primary execution unit configured to receive and execute the primary execution unit instructions from the instruction cache; an auxiliary execution unit configured to receive and execute only the auxiliary execution unit instructions from the instruction cache in a manner independent from and asynchronous to the primary execution unit; and completion circuitry configured to coordinate completion of the primary execution unit instructions by the primary execution unit and the auxiliary execution unit instructions according to the sequential order.

A computing device includes: a memory storing a series of digitally encoded fixed-point instructions and floating point instructions in a sequential order; an instruction cache storing a subset of the fixed-point instructions and the floating point instructions stored by the memory; a fixed-point execution unit and a floating point execution unit operative such that a receipt and execution of the fixed-point instructions by the fixed-point execution unit is asynchronous to a receipt and execution of the floating point instructions by the floating point execution unit; and control circuitry configured to coordinate completion of the fixed-point instructions and the floating point instructions by the fixed-point execution unit and the floating point execution unit instructions according to the sequential order.

A method of controlling execution unit operations in a computing device includes: storing computer instructions in a memory according to a sequential order; caching at least a subset of the computer instructions in an instruction cache; classifying each computer instruction in the instruction cache as at least one of a primary execution unit instruction and an auxiliary execution unit instruction; asynchronously providing the primary execution unit instructions to a primary execution unit and the auxiliary execution unit instructions to an auxiliary execution unit; asynchronously executing the primary execution unit instructions and the auxiliary execution unit instructions in the primary execution unit and the auxiliary execution unit, respectively; and controlling the primary execution unit and the auxiliary execution unit such that the primary execution unit instructions and the auxiliary execution unit instructions are completed synchronously according to the sequential order.

A computer system includes a memory device and a processor. The memory device has computer-readable program code stored thereon, the computer-readable program code including a series of digitally encoded fixed-point instructions and floating point instruction in sequential order; and a processor. The processor includes: an instruction cache storing a subset of the fixed-point instructions and the floating point instructions stored by the memory; a fixed-point execution unit and a floating point execution unit operative such that a receipt and execution of the fixed-point instructions by the fixed-point execution unit is asynchronous to a receipt and execution of the floating point instructions by the floating point execution unit; and control circuitry configured to coordinate completion of the fixed-point instructions and the floating point instructions by the fixed-point execution unit and the floating point execution unit instructions according to the sequential order.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

The present specification discloses methods and systems directed to the use of a primary execution unit and an auxiliary execution unit to asynchronously execute instructions. In the methods and systems disclosed herein, the primary execution unit and the auxiliary execution unit function asynchronously from the point of fetching instructions from an instruction cache. The primary execution unit receives and executes primary execution unit instructions from the instruction cache asynchronously to the auxiliary execution unit receiving and executing auxiliary execution instructions from the instruction cache. Completion circuitry coordinates the completion of the primary execution unit instructions and the auxiliary execution unit instructions according to a sequential order defined by the program to which the instructions belong. In this way, a high-frequency computing device can efficiently execute different types of computer instructions with in-order completion and without the need for lock-step handshaking between different execution units.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "circuitry, a "module" or a "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It should further be understood that while the present specification discloses specific circuitry and functionality of specific computing devices (e.g., CPUs), it is contemplated that all of the functionality described with relation to a specific hardware computing device having a specific hardware architecture may also be implemented as a virtual machine implemented in software executed by a computing device having a different hardware architecture than that described in connection with a particular example. Such virtual embodiments are considered to be within the scope of the present specification.

As used in the present specification and in the appended claims, the term "execute" in the context of a computer instruction refers to obtaining a result for an operation specified in the computer using operands specified in the computer instruction.

As used in the present specification and in the appended claims, the term "complete" in the context of a computer instruction refers to updating a resource specified by the computer instruction with a result obtained by executing the computer instruction.

As used in the present specification and in the appended claims, the term "flush" refers to removing selected computer instructions from the instruction queue and/or pipelines of an execution unit in response to a determination that the selected computer instructions correspond to a branch misprediction.

As used in the present specification and in the appended claims, the term "set" in the context of a bit refers to storing a value of 1 to the bit.

As used in the present specification and in the appended claims, the term "clear" in the context of a bit refers to storing a value of 0 to the bit.

Figure 1:
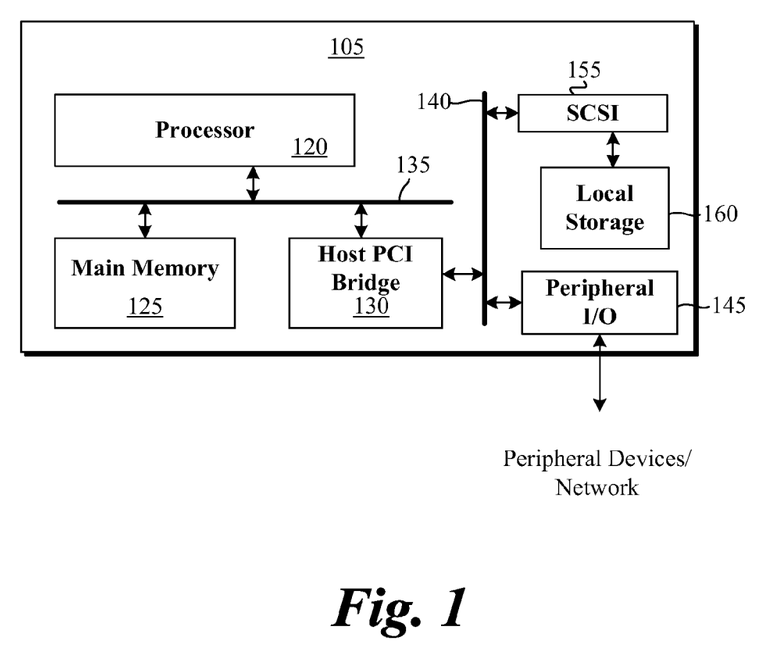
FIG. 1 is a block diagram of an illustrative computing device, according to one example of principles described herein.

With reference now to FIG. 1, a block diagram is shown of an illustrative computing device (105) that may be used to implement the principles described herein The hardware platform of the computing device (105) may include at least one processor (120) that executes code stored in a main memory (125). In certain embodiments, the processor (120) may be a multi-core processor having multiple independent central processing units (CPUs), with each CPU having its own L1 cache and all CPUs sharing a common bus interface and L2 cache. Alternatively, the processor (120) may be a single-core processor.

The at least one processor (120) may be communicatively coupled to the main memory (125) of the hardware platform and a host peripheral control interface (PCI) bridge (130) through a main bus (135). The main memory (125) may include dynamic non-volatile memory, such as random access memory (RAM). The main memory (125) may store executable code and data in the form of a series of digitally encoded instructions in a sequential order. The executable code and data may be obtainable by the processor (120) through the main bus (135).

The host PCI bridge (130) may act as an interface between the main bus (135) and a peripheral bus (140) used to communicate with peripheral I/O devices (145). Among these peripheral devices may be a network interface configured to communicate with an external network, external human interface devices (e.g., monitor, keyboard, mouse, touch screen, speaker, microphone), other external devices (e.g., external storage, dongles, specialized tools), serial buses (e.g., Universal Serial Bus (USB)), and the like. A Small Computer System Interface (SCSI) (155) for communicating with local storage devices (160) may also communicate with the peripheral bus (140).

It will be readily apparent to those having skill in the art that the present configuration of the computing device (105) is merely illustrative of one type of computing device (105) that may be used in connection with the principles described in the present specification. Moreover, it will be further apparent that various modifications, additions, and deletions to the computing device (105) shown are conceivable and anticipated by the present specification.

The computing device (105) is configured to implement elements of software functionality according to the executable code stored in the main memory (125). The computing device (105) may, for example, execute an operating system that interacts with and manages the performance of hardware resources in the computing device (105), including the processor(s) (120), the main memory (125), and the peripheral devices. As such, the operating system may control the execution of computer programs by the processor(s) (120).

Figure 2:
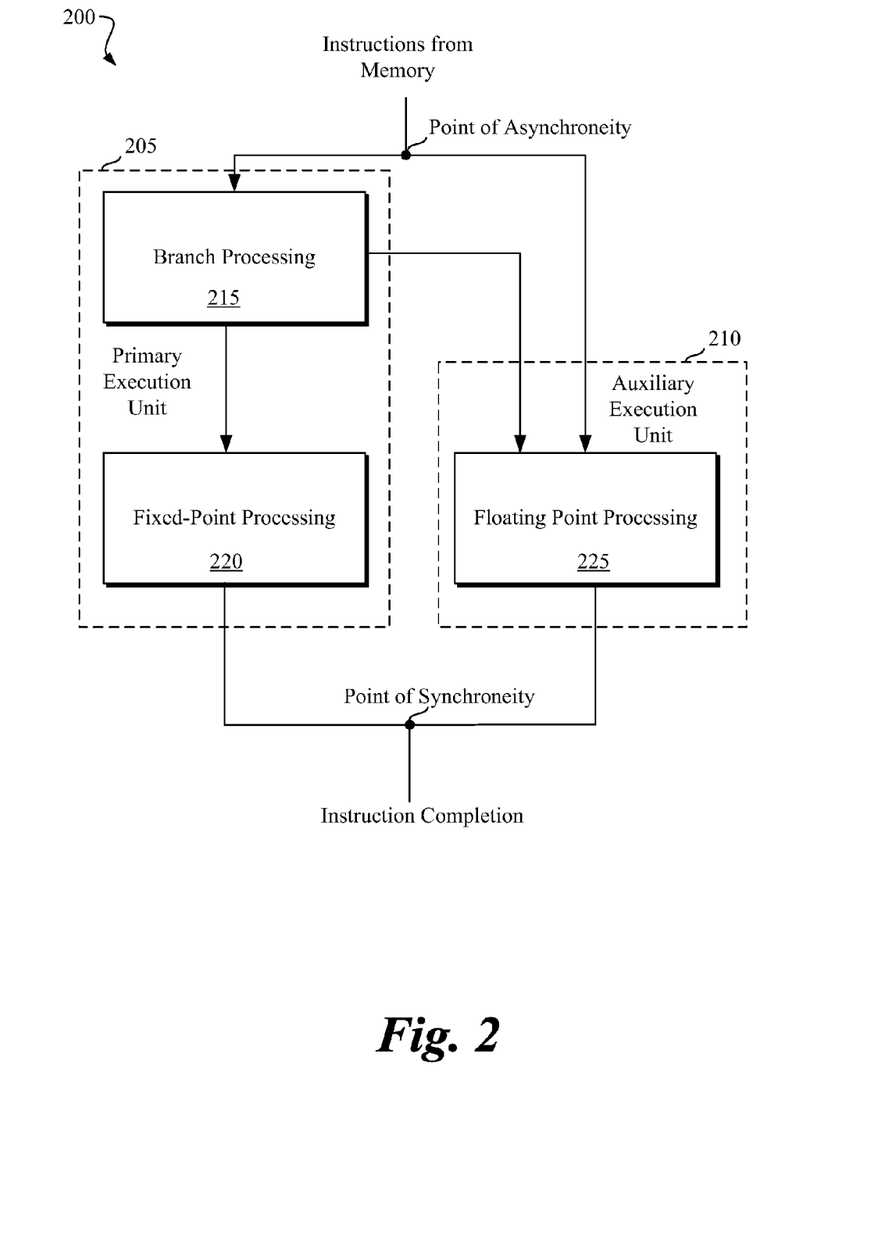
FIG. 2 is a block diagram of an illustrative flow of instruction processing in a computing device, according to one example of principles described herein.

Referring now to FIG. 2, a block diagram is shown of an illustrative flow (200) of instruction processing in a computing device, according to one example. In this example, the processor of the computing device includes a primary execution unit (205) that executes fixed-point instructions and an auxiliary execution unit (210) that executes floating point instructions. However, it should be understood that these particular types of instructions are merely exemplary, and that in certain applications, other types of execution units may be used that process different types of data. Such embodiments are still considered to be within the scope of the present specification. These execution units (205, 210) are shown with dashed lines to indicate the hardware that accomplishes the illustrated functionality.

Both fixed-point instructions and floating point instructions are stored in memory, and the primary execution unit (205) and the auxiliary execution unit (210) may both be configured to fetch and execute their respective instructions asynchronously and independently. The instructions will then be completed according to their original order in the program stored in memory. To this end, the primary execution unit (205) may retrieve all instructions, execute the fixed-point instructions, and coordinate the completion of instructions by both the primary execution unit (205) and the auxiliary execution unit (210). On the other hand, the auxiliary execution unit (210) may be configured to retrieve and execute only the instructions that require execution by the auxiliary execution unit (210). Of course, certain types of instructions (e.g., floating point loads and stores) in memory may require both processing by both the primary execution unit (205) and the auxiliary execution unit (210), in which case both the primary execution unit (205) and the auxiliary execution unit (210) will retrieve and execute those particular types of instructions.

However, because the auxiliary execution unit (210) retrieves and executes only floating point instructions (i.e., not fixed-point instructions), the point of asynchroneity between the primary execution unit (205) and the auxiliary execution unit (210) occurs at the point the instructions are retrieved from memory by the separate execution units (205, 210).

In the example of FIG. 2, the primary execution unit handles branch processing (215). Thus all branch instructions are retrieved, evaluated, and executed by the primary execution unit (205). In the case of a pipelined computing device utilizing a branch predictor, the branch processing (215) may also determine when a branch misprediction occurs and cause both the primary execution unit (205) and the auxiliary execution unit (210) to flush any received instructions that are more recent than the mispredicted branch instruction. In addition to branch processing (215), the primary execution unit executes fixed-point processing (220) on fixed-point instructions received from memory. The auxiliary execution unit (210) executes floating point processing (225) on floating point instructions received from memory.

While the primary execution unit (205) and the auxiliary execution unit (210) may receive, issue and execute instructions asynchronously from each other to obtain results for those instructions, the instructions are completed according to an original order of those instructions in memory. Thus, when the primary execution unit (205) or the auxiliary execution unit (210) executes an instruction, the results of that instruction may first be written into temporary memory. Then, when the results in temporary memory are used to update resources specified by the respective instructions according to the original order of the instructions in memory. Consequently, the point of synchroneity between the primary execution unit (205) and the auxiliary execution unit (210) occurs at the point of instruction completion.

The instruction flow of FIG. 2 exhibits many advantages over prior art computing systems. For example, because each execution unit (205, 210) retrieves only relevant instructions from memory, processing resources are not wasted on executing the same instruction in lockstep with both execution units (205, 210). Furthermore, because the retrieval and execution of instructions between the execution units (205, 210) is asynchronous, the control timing for the execution units (205, 210) can be simpler than that of many prior art computing systems.

Figure 3:
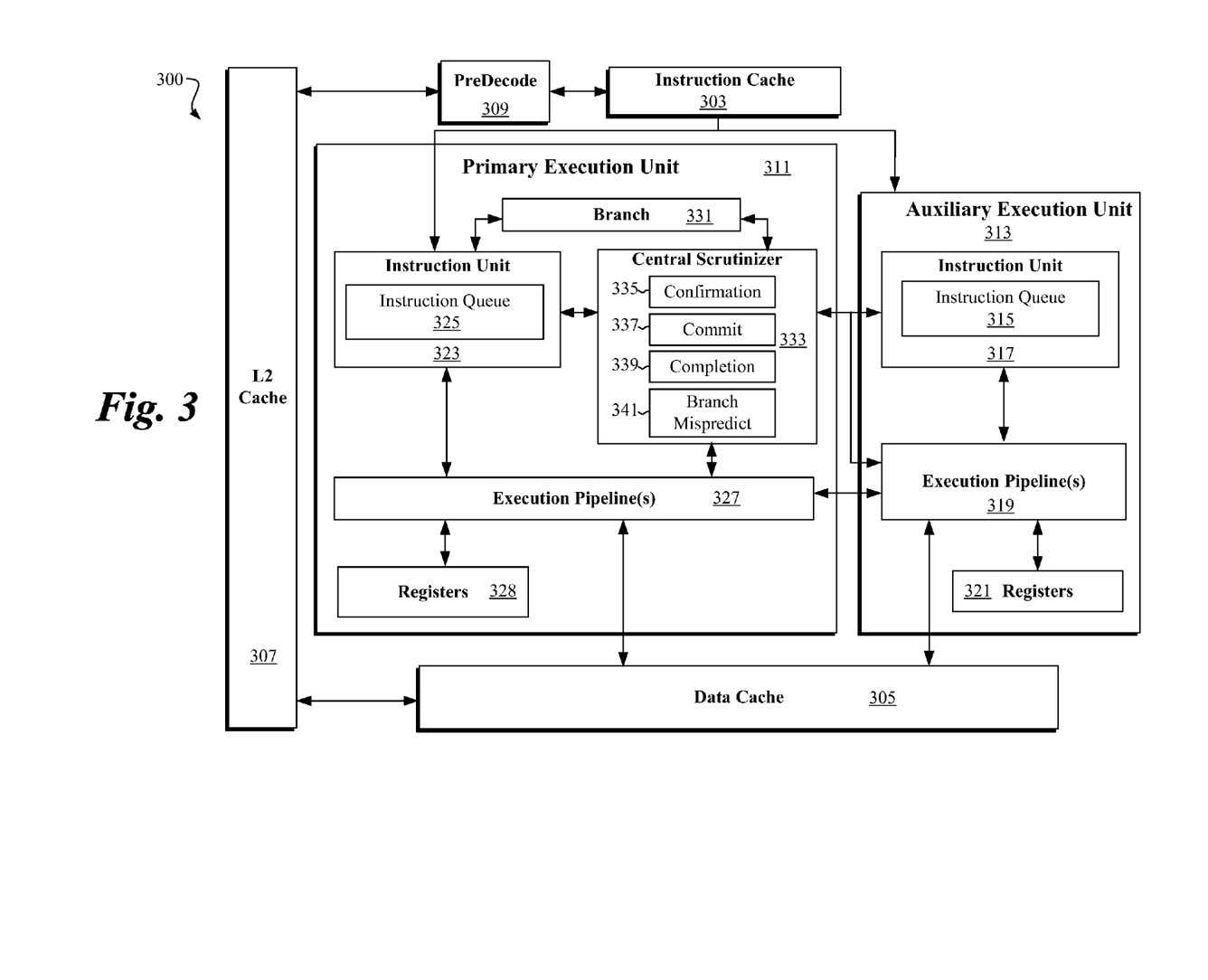
FIG. 3 is a block diagram of an illustrative computing device according to one example of principles described herein.

Referring now to FIG. 3, a block diagram is shown of an illustrative processor (300) in a computing device implementing the instruction flow shown in FIG. 2. The illustrative processor (300) includes an L1 cache that can be subdivided into an instruction cache (303) and a data cache (305) to access instructions and data from memory, respectively. The instruction cache (303) and the data cache (305) may be populated with instructions and data from an L2 cache (307), which interacts with main memory. The instruction cache (303) and the data cache (305) may have less read/write latency than the L2 cache (307), which may have less read/write latency than main memory. Traditional processor caching principles and rules may be implemented in conjunction with the instruction cache (303), the data cache (305), and the L2 cache (307).

The next instructions to be executed by the processor (300) are stored in the instruction cache (303) in a sequential order corresponding to the order in which the instructions are to be completed. As each instruction enters the instruction cache (303) from the L2 cache (307), the instruction may pass first through predecode circuitry (309). The predecode circuitry (309) contains hardware that ascertains various characteristics of the instruction, such as the type of instruction and whether the instruction corresponds to a primary execution unit (311), an auxiliary execution unit (313), or both.

These predecoded characteristics are stored with the instruction in the instruction cache (303) as additional bits. Based on these additional bits attached to each instruction in the instruction cache (303), the instructions intended for the auxiliary execution unit (313) can be filtered out and transmitted to the auxiliary execution unit (313) such that the auxiliary execution unit (313) receives only the instructions requiring its particular set of resources. The auxiliary execution unit instructions may be transmitted from the instruction cache (303) to the auxiliary execution unit (313) and stored in an instruction queue (315) of an instruction unit (317). This transmission may occur in response to a signal from the auxiliary execution unit (313) that a certain amount of room is available in its instruction queue (315).

The instruction unit (317) of the auxiliary execution unit (313) includes circuitry to decode the instructions in the instruction queue (315) and issue each instruction to an execution pipeline (319) for execution according to queue positioning and pipeline availability. The auxiliary execution unit (313) may be configured to perform out of order (OoO) execution on the instructions in the instruction queue (315) according to pipeline availability. Once the appropriate execution pipeline (319) in the auxiliary execution unit (313) has executed an instruction, the results of the executed instruction will be stored in a queue within the execution pipeline (319) until the auxiliary execution unit is allowed to complete the instruction by updating a resource specified by the instruction. The resource may be, for example, a register (321) within the auxiliary execution unit (313) or a location in main memory, accessed through the data cache (305).

The primary execution unit (311) also includes an instruction unit (323) with an instruction queue (325) for storing instructions received from the instruction cache (303). The instruction queue (325), execution pipeline(s) (327), and registers (329) exhibit similar functionality to their counterparts in the auxiliary execution unit, except with a different type of data. That is to say, the instruction unit (323) issues instructions within the instruction queue (325) to corresponding pipelines (327) according to queue positioning and pipeline availability. Once an execution pipeline (327) obtains results for a particular instruction, the results are stored in a queue until the instruction is permitted to complete.

The primary execution unit (311) of the present example also includes some components that are not found in the auxiliary execution unit, such as a branch module (331) and a central scrutinizer (333). The branch module (331) may contain branch predictor circuitry to allow for continuous pipelined execution of instructions according to a branch history table, using known methods.

The central scrutinizer (333) tracks and coordinates the activities of the primary execution unit (311) and the auxiliary execution unit (313). Through this coordination, the central scrutinizer (333) enables the two execution units (311, 313) to preserve asynchroneity in the receipt and execution of instructions between the two execution units while maintaining the correct sequential completion order. To accomplish this goal, the central scrutinizer includes confirmation circuitry (335), commit circuitry (337), completion circuitry (339), and branch mispredict circuitry (341).

The confirmation circuitry (335) evaluates each instruction in the instruction queues (315, 325) and the instruction cache (303) to determine if the instruction will cause an exception during execution. The confirmation of some instructions may be contingent on the results of executing other instructions. Other instructions may be confirmed by simply examining the content of the instruction. As such, the confirmation process need not occur according to the sequence of instructions in the program being executed.

The commit circuitry (337) marks each instruction in the instruction queues (315, 325) that is guaranteed to complete as "committed." The commit circuitry (337) may mark an instruction as committed if all instructions previous to that instruction have either been confirmed or committed. Positions in the instruction queues (315, 325) may be marked as committed by setting a commit bit associated with that particular position. The completion circuitry (339) coordinates the completion of instructions in the execution pipelines (319, 327) according to whether the instructions have committed and the original sequence of the instructions in the program being executed. By handling completion of instructions in this way, the central scrutinizer (333) eliminates the need for lock step handshaking between the execution units (311, 313) or an indication by the auxiliary execution unit (313) to the primary execution unit (311) that execution of an instruction has completed.

The branch mispredict circuitry (341) tracks speculative instruction execution based on the predicted outcomes of branch instructions from the branch module (331). If the branch mispredict circuitry (341) detects that a branch instruction has been mispredicted, the branch mispredict circuitry (341) will initiate a flush of all instructions newer than the mispredicted branch instruction in the instruction queues (315, 325) and execution pipelines (319, 327). The auxiliary execution unit (313) may be configured to execute the flush itself after receiving an indication from the central scrutinizer (341) of the primary execution unit (311) that a branch mispredict has occurred and an index associated with the mispredicted branch instruction to serve as a basis from which newer instructions can be ascertained.

The commit signals from the central scrutinizer (333) and flush signals from the branch mispredict circuitry (341) or interrupt circuitry (not shown) are configured to have equal timing. For example, the same timing frequency may be used for both commit signals and flush signals. Additionally, the period of timing signals used for commit signals and flush signals may be substantially equal and aligned. This is achieved by routing all flush and commit signals through the central scrutinizer (333). In this way, the primary execution unit (311) and the auxiliary execution unit (313) may maintain a greater degree of physical separation. For example, in certain examples the auxiliary execution unit (313) may be implemented on a different chip or card than the primary execution unit (311). Despite this physical separation, the equal timing of the commit signals and flush signals (1) eliminates the need for a 'lock step' handshake between the primary execution unit (311) and the auxiliary execution unit (313), (2) eliminates the need for other handshake signals to track whether the auxiliary execution unit (313) has completed execution of instructions or has performed the necessary computations for an auxiliary execution load/store, and (3) eliminates the need for a synchronization handshake between the execution units (311, 313) at the end of each operation.

It should be understood that while the central scrutinizer (333) circuitry is shown as a separate module within the primary execution unit (311) in the present example, in other examples the central scrutinizer (333) circuitry may be considered as a subsystem of an existing module in the primary execution unit (311), such as the instruction unit (323). Alternatively, the central scrutinizer (333) may in other examples be considered a separate module altogether from the primary execution unit (311). It should further be understood that while the functionality of the central scrutinizer (333) has been illustrated in the present example as including four separate subsystems (335, 337, 339, 341), this organization is shown for clarity only, and any configuration of circuitry that accomplishes the functionality of the central scrutinizer (333) may be used as may suit a particular embodiment of these principles.

Figure 4:
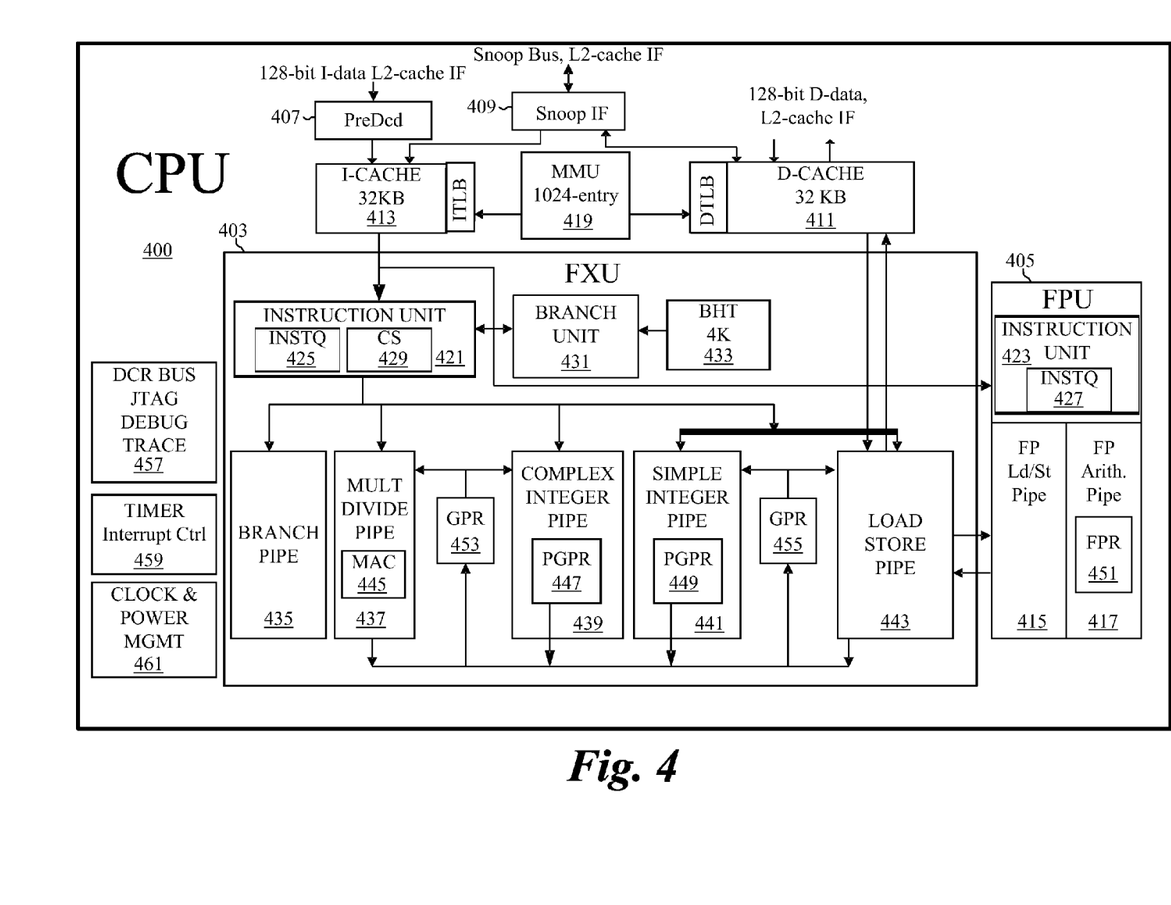
FIG. 4 is a block diagram of an illustrative computing device according to one example of principles described herein.

FIG. 4 shows a more detailed block diagram of a central processing unit (CPU) (400) that operates according to the principles described above. The central processing unit (400) of this example includes a fixed-point primary execution unit (403) for executing fixed-point instructions and a floating point auxiliary execution unit (405) for executing floating point instructions.

As with the example shown in FIG. 3, the CPU (400) of the present example includes an L2 cache that caches instructions and data from main memory. Three separate modules in the CPU (400) may communicate directly with the L2 cache, specifically a predecode module (407), a snoop module (409), and a data cache (411).

The predecode module (407) receives instructions from the L2 cache, predecodes the instructions, and stores each predecoded instruction in a 32 kB instruction cache (413) together with predecode bits indicative of information garnered about that particular instruction from the predecode process. In one example, eight bits of predecoded data are stored with each instruction. Bit 0 qualifies the instruction as either a branch (1) or other (0) instruction. When bit 0 is equal to 0, bit 6 qualifies the instruction as either a floating point instruction (1) or a non-floating point instruction (0). These two bits combined allow the floating point auxiliary execution unit (405) to load and execute only floating point instructions. For floating point instructions, bit 3 indicates whether the instruction will require a load/store pipeline (1) (415) or an arithmetic pipeline (0) (417) in the floating point auxiliary execution unit (405). Bit 7 may indicate whether a floating point instruction is a load instruction (1) or other (0) instruction. These predecode bits may be used by the floating point auxiliary execution unit (405) during instruction issue and execution.

The snoop module (409) helps achieve cache coherence among multiple processors by monitoring the main bus for broadcasts which may cause it to invalidate data in the L2 cache.

The data cache (411) is a 32 kB cache which stores 128-bit data words from main memory for use in the completion of instructions in the instruction cache (413), such as load or store instructions. As will be readily understood by those having skill in the art, changes made to the data cache (411) resulting from the completion of instructions will be written to the L2 cache, and synced with main memory. Each of the instruction cache (413) and the data cache (411) has an associated translation lookaside buffer (ITLB, DTLB, respectively) to facilitate virtual address translation speed in conjunction with a 1024 entry memory management unit (419).

Each of the fixed-point primary execution unit (403) and the floating point auxiliary execution unit (405) has its own instruction unit (421, 423, respectively) with an instruction queue (425, 427, respectively). The instruction unit (421) of the fixed-point primary execution unit (403) and the instruction unit (423) of the floating point auxiliary execution unit (423) each receive instructions from the instruction cache (413) asynchronously and store these instructions in their respective instruction queues (425, 427). Thus, the floating point auxiliary execution unit (405) identifies floating point instructions from the instruction cache (413) by the predecode data attached to each instruction, receives only floating point instructions from the instruction cache (413), and ignores all other instructions in the instruction cache (413).

In the present example, the instruction queue (427) of the floating point auxiliary execution unit (405) has a total of eight queue positions, numbered 0 to 7. The oldest instruction is always in position 0, the second oldest instruction is always in position 1, and so on. The instruction queue (427) of the floating point auxiliary execution unit (405) need not operate lock step with the instruction queue (425) of the fixed-point primary execution unit, as the floating point auxiliary execution unit (405) only stores and executes floating point instructions.

In certain embodiments, instructions will be received by the floating point auxiliary execution unit (405) only upon a determination that the instruction queue (427) of the floating point auxiliary execution unit (405) has a certain number of available positions (e.g., 4). Such a determination may be made by a control bit that goes high or low depending on whether the predetermined number of positions is available in the instruction queue (427). In this way, the control bit may trigger the release of a group of floating point instructions from the instruction cache (413) to the floating point auxiliary execution unit (405).

In the present example, a central scrutinizer (429) similar to that described in relation to FIG. 3 is implemented within the instruction unit (421) of the fixed-point primary execution unit (403). The central scrutinizer (429) tracks the progress of instructions through both the fixed-point primary execution unit (403) and the floating point auxiliary execution unit (405). As such, the central scrutinizer (429) manages the confirmation, commit bits, and completion of instructions by the fixed-point primary execution unit (403) and the floating point auxiliary execution unit (405). Additionally, the central scrutinizer (429) works cooperatively with a branch unit (431). The branch unit (431) uses a branch history table (433) to make predictions about upcoming branch instructions to keep the execution pipelines full. The branch unit (431) further monitors the result of the execution of branch instructions by a branch pipeline (435) in the fixed-point primary execution unit (403) to identify the occurrence of branch mispredictions. In the event a branch misprediction occurs, the central scrutinizer (429) may initiate a flush of all instructions in the instruction queue (425) of the fixed-point primary execution unit (403) and the instruction queue (427) of the floating point primary execution unit (405) by instructing each instruction unit (421, 423) to remove all instructions from its respective instruction queue (425, 427) that are more recent than the mispredicted branch instruction.

Each instruction in each instruction queue (425, 427) is decoded to determine an appropriate pipeline for executing that particular instruction. The pipelines implemented by the fixed-point primary execution unit (403) of the present example include a branch pipeline (435) for executing branch instructions, a multiplication/division pipeline (437) for executing multiplication and division operations using fixed-point operands, a complex integer pipeline (439) for executing complex fixed-point arithmetic operations, a simple integer pipeline (441) for executing simple fixed-point integer operations, and a load store pipeline (443) for executing instructions to load data from main memory into a particular register or write data from a particular register into main memory. The floating point auxiliary execution unit (405) includes a floating point load/store pipeline (415) for performing floating point computations related to a load or store instruction, and a floating point arithmetic pipeline (417) for executing arithmetic instructions using floating point operands.

Various other types of auxiliary circuitry may be present in the execution units (403, 405) for use in the execution of instructions by the individual pipelines. For example, the multiplication/division pipeline (437) of the fixed-point primary execution unit (403) includes a Multiplication and Accumulation unit (445). The complex integer pipeline (439) and the simple integer pipeline (441) include pipelined general purpose registers (447, 449). The floating point arithmetic pipeline (417) of the floating point auxiliary execution unit (405) has at least one floating general purpose register (451), and multiple general purpose registers (453, 455) may be used to store intermediate or completed results of the pipelines. It should be recognized that additional circuitry necessary or useful for carrying out the operations of the various individual pipelines in the execution units (403, 405) has been omitted FIG. 4 for the purpose of clarity. However, this additional circuitry will be readily apparent to one having skill in the art.

The execution units (403, 405) may issue instructions from their respective queues (425, 427) to their individual execution pipelines (435, 437, 439, 441, 443, 415, 417) according to queue positioning and pipeline availability, where issue is not synchronous between the primary execution unit (403) and the auxiliary execution unit (405). The oldest queue positions may always have priority over newer queue positions when instructions are issued to their corresponding pipelines. Thus, if position 0 of an instruction queue (427) requires the same pipeline (417) as position 1 of the same instruction queue (427), the instruction at position 0 will always issue to the pipeline first. However, if position 0 and position 1 of an instruction queue (427) require different pipelines, the pipeline needed by the instruction in position 0 is unavailable, and the pipeline needed by the instruction in position 1 is available, the instruction in position 1 of the instruction queue (427) will be issued to its pipeline before the instruction in position 0. By performing out-of-order execution in this way, the pipelines are kept full and processor efficiency is maintained to the extent possible.

The CPU (400) further includes a Device Control Register (DCR) Bus and Debug block (457), a timer block (459), and a clock and power management block (461). The DCR Bus and Debug block (457) allows the CPU to access the DCRs of various devices on the bus, and provides support for Joint Test Action Group (JTAG) and other debugging. The timer block (459) detects and executes interrupts, including initiating the necessary flushes in the execution units (403, 405), and the clock and power management block (461) provides clock and timing signals and manages power consumption by the CPU (400).

As with the embodiment described in relation to FIG. 3, commit signals from the central scrutinizer (429) control the completion of instructions in both the primary fixed point execution unit (403) and the auxiliary floating point execution unit (405). Furthermore, flush signals from the branch unit (431) or interrupt circuitry (459) are configured to have equal timing. For example, the same timing frequency may be used for both commit signals and flush signals. This is achieved by routing flush signals from the branch unit or interrupt unit through the central scrutinizer (429) and transmitted to all units from the central scrutinizer (429).

Additionally, the period of timing signals used for commit signals and flush signals may be substantially aligned. In this way, the primary fixed point execution unit (403) and the auxiliary floating point execution unit (405) may maintain a greater degree of physical separation. For example, in certain examples the auxiliary floating point execution unit (405) may be implemented on a different chip or card than the primary fixed point execution unit (403). Despite this physical separation, the equal timing of the commit signals and flush signals allows for sequential instruction execution between the primary fixed point execution unit (403) and the auxiliary floating point execution unit (405) while (1) eliminating the need for a 'lock step' handshake between the primary fixed point execution unit (403) and the auxiliary floating point execution unit (403), (2) eliminating the need for other handshake signals to track whether the auxiliary floating point execution unit (405) has completed execution of instructions or has performed the necessary computations for floating point load/store operations, and (3) eliminating the need for a synchronization handshake between the execution units (403, 405) at the end of each operation.

Figure 5:
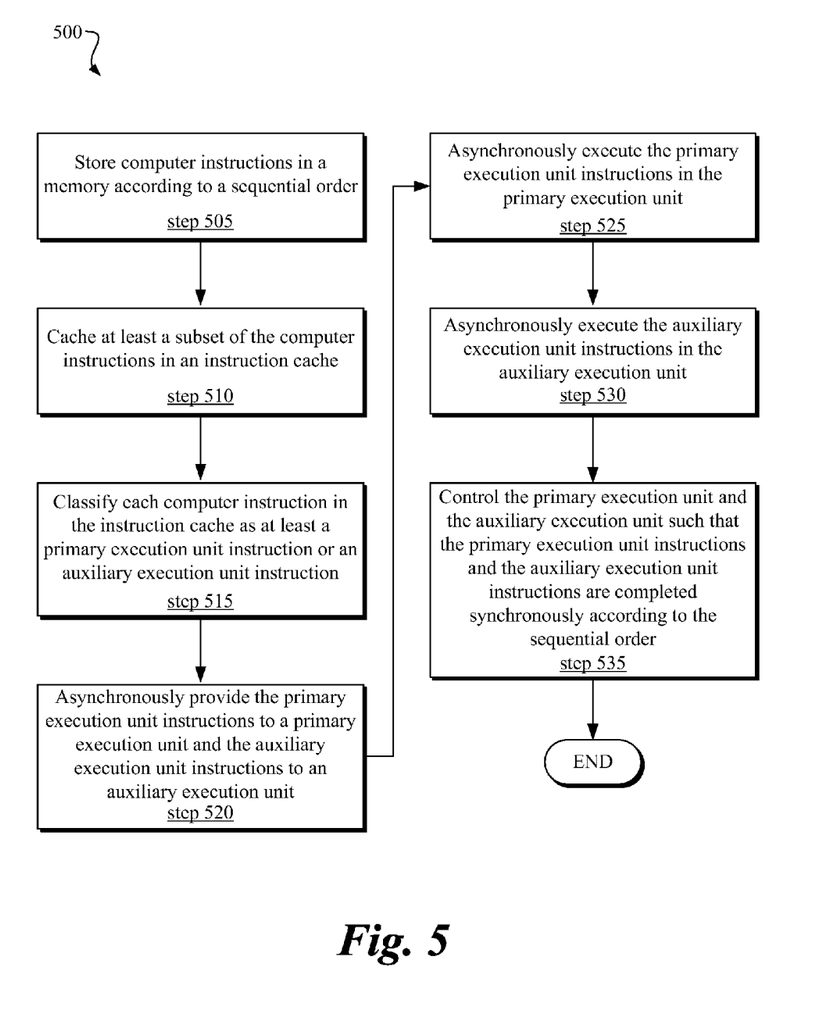
FIG. 5 is a flowchart diagram of an illustrative method of processing computer instructions according to one example of principles described herein.

Referring to FIG. 5, a method (500) of processing computer instructions will now be described with respect to the CPU (400) of FIG. 4. In the method (500), computer instructions are stored (step 505) in a main memory according to a sequential order. These relevant portions of main memory are available to the CPU (400) through the use of at least a level 2 cache. The CPU (400) caches (step 510) at least a subset of the computer instructions in an instruction cache (413) and classifies (step 515) each computer instruction in the instruction cache as at least a primary execution unit instruction or an auxiliary execution unit instruction. In the example of FIG. 4, this classification is performed by the predecode module (407) and the results of the classification are stored as predecode bits with the instructions in the instruction cache (413) as explained above.

Primary execution unit instructions and auxiliary execution unit instructions are asynchronously provided (step 520) from the instruction cache (413) to the primary execution unit (403) and the auxiliary execution unit (405), where the instructions are stored in respective instruction queues (425, 427). Each execution unit (403, 405) independently and asynchronously issues instructions from its respective instruction queue (425, 427) to corresponding pipelines (435, 437, 439, 441, 443, 415, 417) with issue logic according to queue positioning, pipeline need, and pipeline availability, as described above. These instructions are then asynchronously executed (steps 525, 530) by the pipelines of the primary execution unit (403) and the auxiliary execution unit (405). In certain examples, out-of-order processing may occur within the pipelines according to the manner in which instructions are issued to a pipeline and the time it takes each pipeline to execute an instruction.

Results for the execution of each instruction may be stored in a queue of its corresponding pipeline until that instruction has been committed by the central scrutinizer (429) of the primary execution unit (403), which controls (step 535) the primary execution unit (403) and the auxiliary execution unit (405) such that the primary execution unit instructions and the auxiliary execution unit instructions are completed synchronously according to the original sequential order of the instructions in the instruction cache (413).

As alluded to earlier, some processing device architectures operating according to the principles described herein may utilize both the primary execution unit (403) and the auxiliary execution unit (405) to execute certain types of program instructions. In particular, the CPU (400) shown in FIG. 4 may be configured to utilize the processing capabilities of both the fixed-point primary execution unit (403) and the floating point auxiliary execution unit (405) to execute control register update instructions, floating point load instructions, and floating point store instructions.

Figure 6:
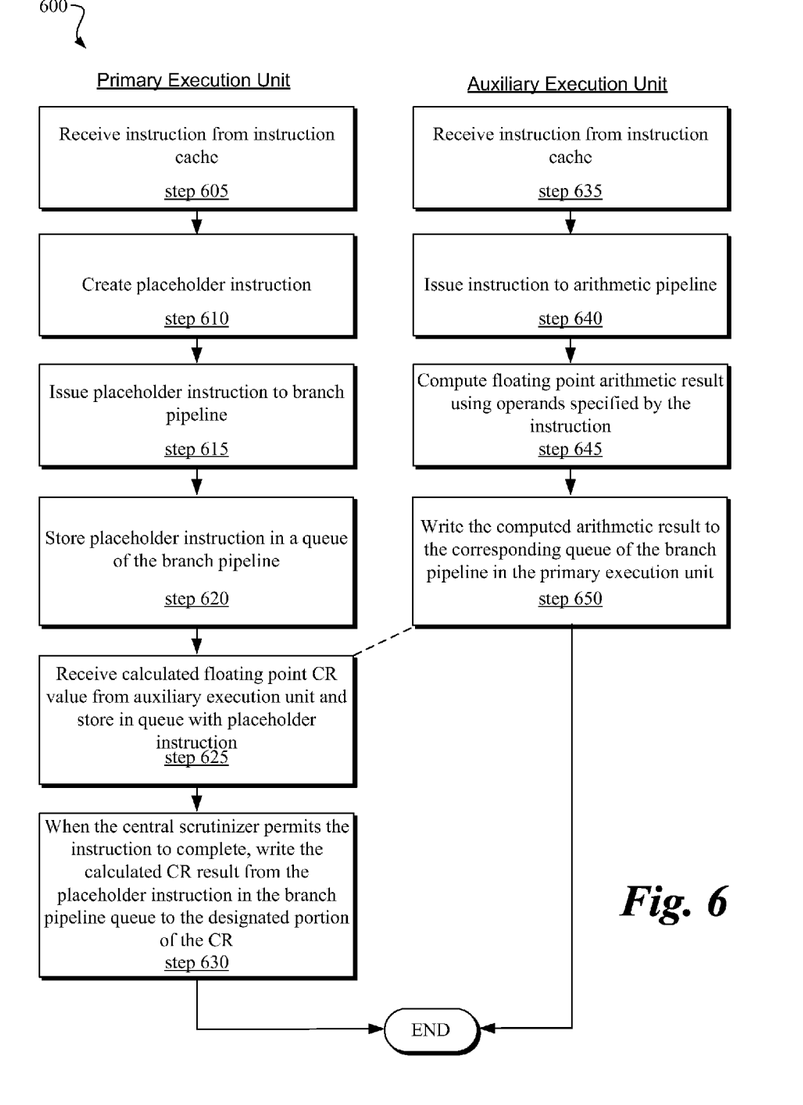
FIG. 6 is a flowchart diagram of an illustrative method of processing a floating point control register update instruction according to one example of principles described herein.
Figure 7:
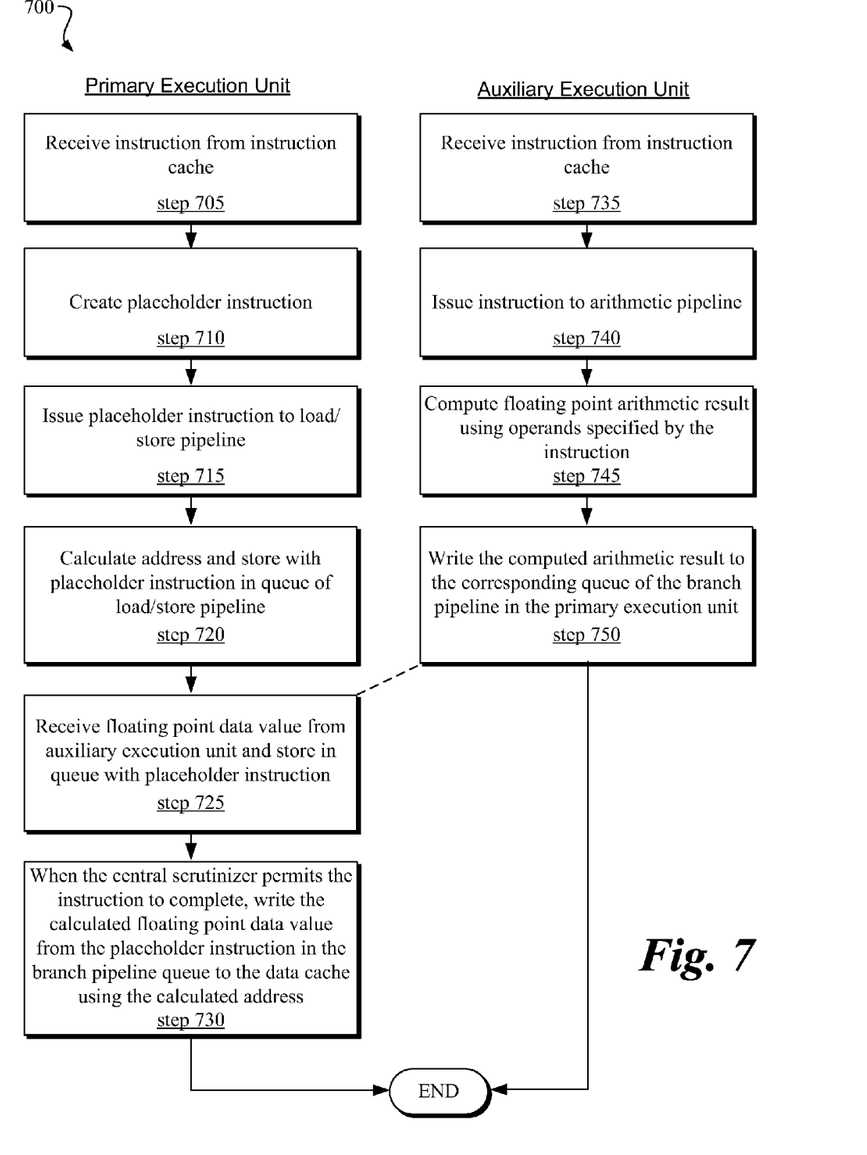
FIG. 7 is a flowchart diagram of an illustrative method of processing a floating point load instruction according to one example of principles described herein.
Figure 8:
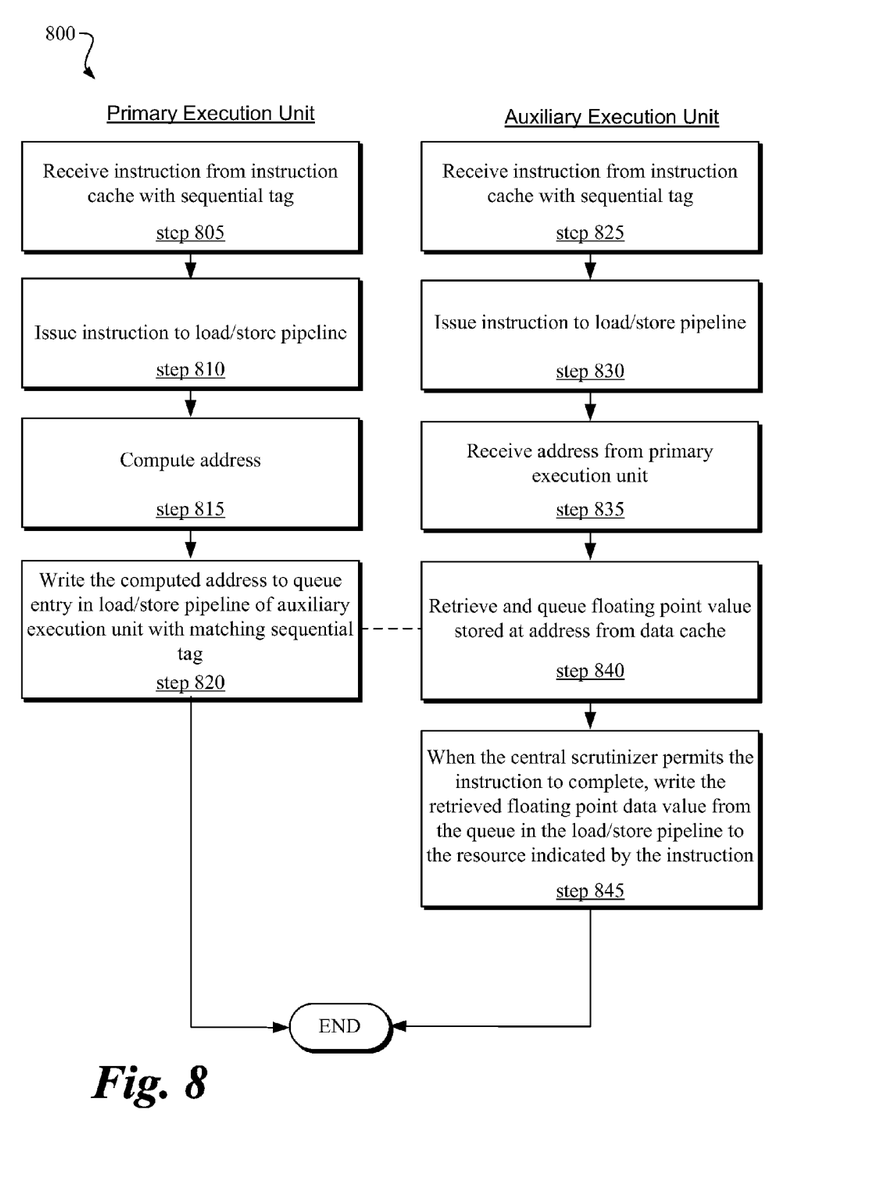
FIG. 8 is a flowchart diagram of an illustrative method of processing a floating point store instruction according to one example of principles described herein.

FIGS. 6-8 illustrate exemplary processes which may be performed by the CPU (400) of FIG. 4 to execute a control register update, a floating point load, and a floating point store instruction, respectively.

Referring now to FIG. 6, an illustrative process (600) of executing a floating point control register update instruction in the CPU (400) of FIG. 4 is shown. In this process (600), the primary execution unit (403) and the auxiliary execution (405) asynchronously receive the floating point control register update instruction from the instruction cache (413). On the primary execution unit (403) side, after the instruction is received (step 605), a placeholder instruction is created (step 610) and issued (step 615) to the branch pipeline (435) consistent with the issue logic of the primary execution unit (403). The placeholder instruction is stored (step 620) in a queue of the branch pipeline (435) until a floating point result is received (step 625) from the auxiliary execution unit (405) and stored in the queue with the placeholder instruction. Then, when the central scrutinizer (429) permits the instruction to complete, the branch pipeline (435) writes (step 630) the calculated floating point control register value from the queue to the portion of the control register designated by the instruction.

On the auxiliary execution unit (405) side, after the instruction is received (step 635), the instruction is issued (step 640) to the arithmetic pipeline (417) consistent with the issue logic of the auxiliary execution unit (405). In the arithmetic pipeline (417), a floating point arithmetic result is calculated (step 645) using operands specified in the instruction and written (step 650) to the aforementioned queue of the branch pipeline as the calculated floating point control register value corresponding to the instruction.

Because instructions are received and executed asynchronously between the execution units (403, 405), it may be possible that the auxiliary execution unit (405) computes the floating point control register value before the corresponding placeholder instruction is stored in the queue of the branch pipeline (435) of the primary execution unit (403). In such cases, the auxiliary execution unit (405) may still write the computed floating point control register value to the queue of the branch pipeline (435) of the primary execution unit (403), and once the placeholder instruction is generated within the branch pipeline (435) of the primary execution unit (403), the received floating point control register value will be associated with the placeholder instruction. Similarly, if the placeholder instruction is created in the queue of the branch pipeline (435) of the primary execution unit (403) prior to receiving the floating point control register value from the auxiliary execution unit (405), the branch pipeline (435) of the primary execution unit (403) will simply wait until the floating point control register data is received from the auxiliary execution unit (405) before proceeding.

Referring now to FIG. 7, an illustrative process (700) of executing a floating point control store instruction in the CPU (400) of FIG. 4 is shown. This process (700) is similar to that of FIG. 6. The primary execution unit (403) and the auxiliary execution unit (405) asynchronously receive the floating point store instruction from the instruction cache (413). On the primary execution unit (403) side, after the instruction is received (step 705), a placeholder instruction is created (step 710) and issued (step 715) to the load/store pipeline (443) consistent with the issue logic of the primary execution unit (403). The address indicated by the instruction is calculated by the load/store pipeline (443) and a placeholder instruction is stored (step 720) with the calculated address in a queue of the load/store pipeline (443) until a floating point result is received (step 725) from the auxiliary execution unit (405) and stored in the queue with the placeholder instruction. Then, when the central scrutinizer (429) permits the instruction to complete, the branch pipeline (435) writes (step 730) the calculated floating point value from the queue to the data cache using the calculated address.

On the auxiliary execution unit (405) side, after the instruction is received (step 735), the instruction is issued (step 740) to the load/store pipeline (415) consistent with the issue logic of the auxiliary execution unit (405). In the load/store pipeline (415), a floating point value is calculated (step 745) using operands specified in the instruction and written (step 750) to the aforementioned queue of the load/store pipeline (443) in the primary execution unit (403) as the calculated floating point value to be stored at the address indicated by the instruction.

Again, because instructions are received, issued, and executed asynchronously between the execution units (403, 405), it may be possible that the auxiliary execution unit (405) computes the floating point value before the corresponding placeholder instruction is stored in the queue of the load/store pipeline (443) of the primary execution unit (403). In such cases, the auxiliary execution unit (405) may still write the computed floating point value to the queue of the load/store pipeline (443) of the primary execution unit (403), and once the placeholder instruction is generated within the load/store pipeline (443) of the primary execution unit (403), the received floating point value will be associated with the placeholder instruction. Similarly, if the placeholder instruction is created in the queue of the load/store pipeline (443) of the primary execution unit (403) prior to receiving the floating point value from the auxiliary execution unit (405), the load/store pipeline (443) of the primary execution unit (403) will simply wait until the floating point value is received from the auxiliary execution unit (405) before proceeding.

Referring now to FIG. 8, an illustrative process (800) of executing a floating point control load instruction in the CPU (400) of FIG. 4 is shown. As with the floating point store instruction, the primary execution unit (403) and the auxiliary execution unit (405) asynchronously receive the floating point load instruction from the instruction cache (413). Because loads are often executed out of order according to memory access optimization, each floating point load instruction is assigned a sequential tag that is received by both the primary execution unit (403) and the auxiliary execution unit (405).

On the primary execution unit (403) side, after the instruction is received (step 805) with the sequential tag, the instruction is issued (step 810) to the load/store pipeline (443) consistent with the issue logic of the primary execution unit (403). The address indicated by the instruction is calculated (step 815) by the load/store pipeline (443) written (step 820) to a queue of the load/store pipeline (415) of the auxiliary execution unit (405) at a position associated with the sequential tag.

On the auxiliary execution unit (405) side, after the instruction is received (step 825) with the sequential tag, the instruction is issued (step 830) to the load/store pipeline (415) consistent with the issue logic of the auxiliary execution unit (405). In the load/store pipeline (415) of the auxiliary execution unit (405), the computed address is received (step 835) from the primary execution unit (403), and the floating point value stored at the computed address is retrieved (step 840) from the data cache and queued in the load/store pipeline (415) of the auxiliary execution unit (405). Then, when the central scrutinizer permits the instruction to complete, the load/store pipeline (415) of the auxiliary execution unit (405) writes (step 845) the retrieved floating point data value from the queue to the resource indicated by the instruction (e.g., a floating point register).

Again, because instructions are received and executed asynchronously between the execution units (403, 405), it may be possible that the primary execution unit (403) computes the address before the corresponding instruction is issued and stored in the queue of the load/store pipeline (415) of the auxiliary execution unit (405). In such cases, the primary execution unit (403) may still write the computed address to the queue of the load/store pipeline (415) of the auxiliary execution unit (405), and once instruction is generated within the load/store pipeline (415) of the auxiliary execution unit (405), the received address will be associated with the instruction by matching the sequential tags. Similarly, if the instruction is issued to the queue of the load/store pipeline (415) of the auxiliary execution unit (405) prior to receiving the calculated address value from the primary execution unit (403), the load/store pipeline (415) of the auxiliary execution unit (405) will simply wait until the address is received from the primary execution unit (403) before proceeding.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:
1. A computing device comprising:
an instruction cache storing primary execution unit instructions and auxiliary execution unit instructions in a sequential order;
a primary execution unit configured to receive and execute said primary execution unit instructions from said instruction cache;
an auxiliary execution unit configured to receive and execute only said auxiliary execution unit instructions from said instruction cache in a manner independent from and asynchronous to said primary execution unit, wherein both said primary and auxiliary execution unit are configured to allow execution of their respective instructions, including arithmetic instructions, out-of-order with respect to said sequential order; and
a central scrutinizer configured to coordinate completion of said primary execution unit instructions by said primary execution unit and said auxiliary execution unit instructions according to said sequential order, the central scrutinizer comprising:

confirmation circuitry to evaluate instructions to determine exceptions that the instructions cause, commit circuitry to mark instructions committed to be completed, completion circuitry to coordinate completion of instructions in the auxiliary execution unit with instruction completion in the primary execution unit, and branch mispredict circuitry to track speculative instructions and initiate flushes on instructions newer than mispredicted branches.

2. The computing device of claim 1, further comprising an instruction queue of the auxiliary execution unit for receiving the auxiliary execution unit instructions from the instruction cache, wherein the auxiliary execution unit is configured to perform out-of-order execution on the auxiliary execution unit instructions with respect to its own instruction queue.

3. The computing device of claim 1, said auxiliary execution unit further comprising an instruction queue comprising a plurality of storage positions, each said storage position in said instruction queue storing a said received auxiliary execution unit instruction while preserving an order in which said auxiliary execution unit instructions were received from said instruction cache.

4. The computing device of claim 3, further comprising control circuitry configured to identify said auxiliary execution unit instructions in said instruction cache and send a number of said auxiliary execution unit instructions in said instruction cache to said auxiliary execution unit based on a signal from said auxiliary execution unit indicating available space in said instruction queue of said auxiliary execution unit.

5. The computing device of claim 3, said auxiliary execution unit further comprising circuitry configured to implement a plurality of execution pipelines and circuitry configured to associate each of a number of oldest auxiliary execution unit instructions in said instruction queue with one of said execution pipelines.

6. The computing device of claim 5, said auxiliary execution unit further comprising circuitry configured to issue each of said number of oldest auxiliary execution unit instructions in said instruction queue to an execution pipeline associated with said auxiliary execution unit instructions in response to a determination that said execution pipeline associated with said auxiliary execution unit instructions is available.

7. The computing device of claim 5, said auxiliary execution unit being further configured to perform out-of-order execution on said number of oldest auxiliary execution unit instructions in said instruction queue.

8. The computing device of claim 3, further comprising circuitry configured to provide an electronic indication to said auxiliary execution unit of a mispredicted branch in said computing device.

9. The computing device of claim 8, said auxiliary execution unit being further configured to identify and flush any said auxiliary execution unit instruction being stored or executed by said auxiliary execution unit that is more recent than said mispredicted branch.

10. The computing device of claim 3, further comprising:
a commit bit associated with each said auxiliary execution unit instruction in said instruction queue; and
said commit circuitry being further configured to set said commit bit for a selected auxiliary execution unit instruction responsive to a determination that any other auxiliary execution unit instruction in said instruction queue that is older than said selected auxiliary execution unit instruction or has been determined to not cause any hardware exceptions in said computing device.

11. The computing device of claim 10, said commit circuitry being further configured to coordinate completion of said auxiliary execution unit instructions based on said commit bits associated with said instruction queue.

12. A computing device, comprising:
a memory storing a series of digitally encoded fixed-point instructions and floating point instructions in a sequential instruction order;
an instruction cache storing a subset of said fixed-point instructions and said floating point instructions stored by said memory;
a fixed-point execution unit and a floating point execution unit, wherein said fixed-point execution unit and floating point execution unit are configured to receive instructions from said instruction cache and operative such that a receipt and execution of said fixed-point instructions by said fixed-point execution unit is asynchronous to a receipt and execution of said floating point instructions by said floating point execution unit such that both said fixed point execution unit and said floating point execution unit are configured to process arithmetic instructions out-of-order with respect to said sequential instruction order in which said fixed-point and said floating point instructions are stored in respective and separate instruction queues, said floating point execution unit comprises a decoder to separately decode instructions from said instruction cache sent to said floating point execution unit; and
a central scrutinizer configured to coordinate completion of said fixed-point instructions and said floating point instructions by said fixed-point execution unit and said floating point execution unit according to said sequential instruction order, the central scrutinizer comprising:
confirmation circuitry to evaluate instructions to determine exceptions that the instructions cause,
commit circuitry to mark instructions committed to be completed,
completion circuitry to coordinate completion of instructions in the auxiliary execution unit with instruction completion in the primary execution unit, and
a branch mispredict circuitry, to track speculative instructions and initiate flushes on instructions newer than mispredicted branches.

13. The computing device of claim 12, further comprising predecode circuitry disposed between said memory and said instruction cache, said predecode circuitry being configured to:
attach predecode bits to each floating point instruction stored by said instruction cache, said predecode bits indicating that a corresponding instruction is a floating point instruction.

14. The computing device of claim 12, said floating point execution unit further comprising a floating point instruction queue comprising a plurality of storage positions, each said storage position in said floating point instruction queue storing a floating point instruction received from said instruction cache while preserving an order in which said floating point instructions were received from said instruction cache.

15. The computing device of claim 14, further comprising circuitry that identifies said floating point instructions in said instruction cache and sends a number of said floating point instructions in said instruction cache to said floating point execution unit based on a signal from said floating point execution unit indicating available space in said floating point instruction queue of said floating point execution unit.

16. The computing device of claim 14, said floating point execution unit being further configured to perform out-of-order execution on a number of oldest floating point instructions in said floating point instruction queue.

17. The computing device of claim 12, further comprising circuitry that provides an electronic indication to said floating point execution unit of a mispredicted branch in said computing device.

18. The computing device of claim 17, said floating point execution unit being further configured to identify and flush any floating point instruction being stored or executed by said floating point execution unit that is newer than said mispredicted branch.

19. The computing device of claim 12, further comprising:
a commit bit associated with each floating point instruction in said floating point instruction queue of said floating point execution unit; and
circuitry that sets said commit bit for a selected floating point instruction in said floating point instruction queue responsive to a determination that any other floating point instruction in said floating point instruction queue that is older than said selected floating point instruction either has a set commit bit or has been determined to not cause any hardware exceptions in said computing device.

20. The computing device of claim 19, wherein said circuitry is further configured to coordinate completion of said floating point instructions based on commit bits of said floating point instructions in said floating point instruction queue.

21. A method of controlling execution unit operations in a computer device, comprising:
storing computer instructions in a memory according to a sequential order;
caching at least a subset of said computer instructions in an instruction cache;
classifying each of said computer instructions in said instruction cache as at least one of a primary execution unit instruction and an auxiliary execution unit instruction;
asynchronously providing primary execution unit instructions to a primary execution unit and auxiliary execution unit instructions to an auxiliary execution unit, including assigning a sequential tag to each auxiliary execution unit instruction load and providing that sequential tag to both the primary execution unit and the auxiliary execution unit;
asynchronously executing said primary execution unit instructions and said auxiliary execution unit instructions in said primary execution unit and said auxiliary execution unit, respectively, wherein both said primary and auxiliary execution units may execute their respective instructions out-of-order with respect to said sequential order;
coordinating completion of instructions using a central scrutinizer configured to coordinate completion of instructions on said primary execution unit and said auxiliary execution unit according to said sequential order, the central scrutinizer comprising:
confirmation circuitry to evaluate instructions to determine exceptions that said instructions cause,
commit circuitry to mark instructions committed to be completed,
completion circuitry to coordinate completion of instructions in the auxiliary execution unit with instruction completion in the primary execution unit, and
a branch mispredict circuitry, to track speculative instructions and initiate flushes on instructions newer than mispredicted branches.

22. The method of claim 21, further comprising providing an electronic indication to said auxiliary execution unit of a mispredicted branch.

23. The method of claim 22, further comprising identifying and flushing any auxiliary execution unit instruction being stored or executed by said auxiliary execution unit that is newer than said mispredicted branch.

24. The method of claim 22, said electronic indication to said auxiliary execution unit of a mispredicted branch comprising a timing frequency that matches to a timing frequency of commit signals provided to said primary execution unit and said auxiliary execution unit to control completion of said primary execution unit instructions and said auxiliary execution unit instructions.

25. A computer system comprising:
a memory device having computer-readable program code stored thereon, said computer-readable program code comprising a series of digitally encoded fixed-point instructions and floating point instructions in sequential order; and
a processor, said processor comprising:
an instruction cache storing a subset of said fixed-point instructions and said floating point instructions stored by said memory device;
a fixed-point execution unit and a floating point execution unit configured to receive instructions from said instruction cache and operative such that a receipt and execution of fixed-point instructions by said fixed-point execution unit is asynchronous to a receipt and execution of floating point instructions by said floating point execution unit; and
a central scrutinizer to track progress of instructions, including arithmetic instructions, through both the fixed-point execution unit and the floating point execution unit to manage confirmation, commitment, flush, and completion of instructions, without synchronization of operation by the fixed-point execution unit and the floating point execution unit, according to said sequential order; the central scrutinizer comprising:
confirmation circuitry to evaluate instructions to determine exceptions that the instructions cause,
commit circuitry to mark instructions committed to be completed,
completion circuitry to coordinate completion of instructions in the auxiliary execution unit with instruction completion in the primary execution unit, and
a branch mispredict circuitry, to track speculative instructions and initiate flushes on instructions newer than mispredicted branches.

\* \* \* \* \*